W. J. ATCHISON.
REVOLVING HARROW AND CULTIVATOR.

No. 185,061. Patented Dec. 5, 1876.

Witnesses:
P. C. Dieterich.
Frank H. Duffy.

Inventor:
William J. Atchison,
Per: C. H. Watson & Co. Attorneys.

THE GRAPHIC CO. N.Y.

UNITED STATES PATENT OFFICE.

WILLIAM J. ATCHISON, OF ZIONSVILLE, INDIANA, ASSIGNOR OF ONE-HALF OF HIS RIGHT TO JOHN J. ATCHISON, OF SAME PLACE.

IMPROVEMENT IN REVOLVING HARROW AND CULTIVATOR.

Specification forming part of Letters Patent No. 185,061, dated December 5, 1876; application filed October 27, 1876.

*To all whom it may concern:*

Be it known that I, WILLIAM J. ATCHISON, of Zionsville, county of Boone, State of Indiana, have invented certain new and useful Improvements in Revolving Harrows and Cultivators; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to rotary cultivators or pulverizers for stirring up the earth previous to seeding; and has for its object to furnish wheels, which will completely pulverize the earth, leaving it in mellow form, the said device being light of draft, efficient in operation, simple in construction, and not liable to get out of repair; and it consists in providing what is known as a "star-wheel" in rotary cultivators, with side projections, as will be hereinafter more fully described, and pointed out by the claim.

Figure 1:
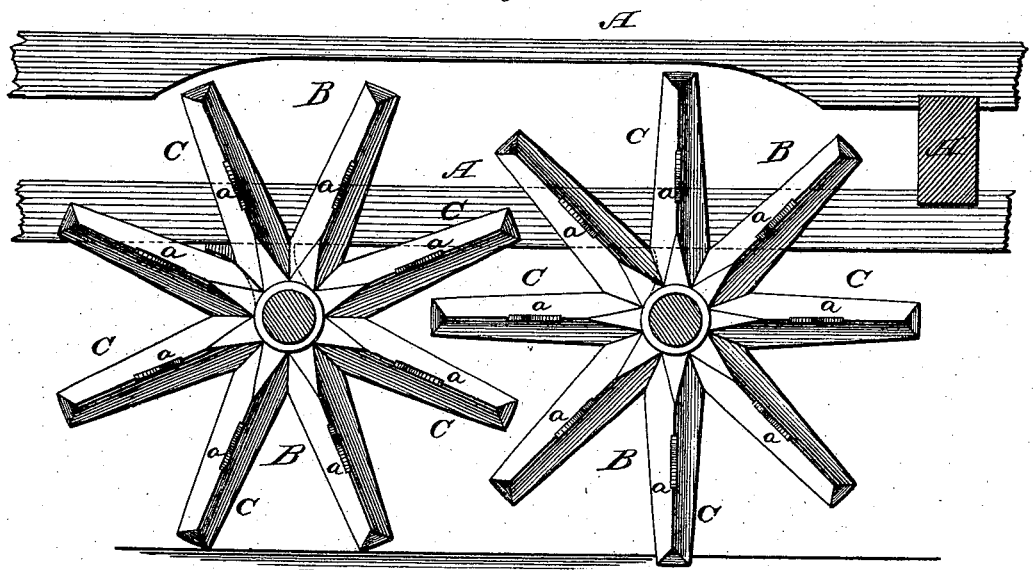
Figure 2:
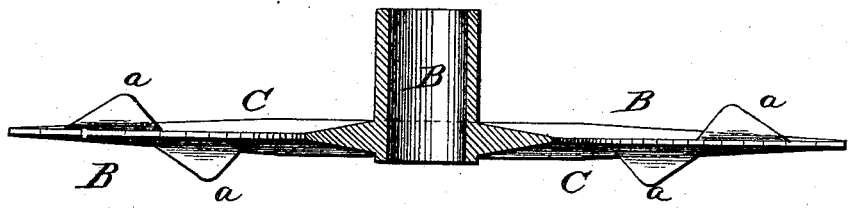

In the annexed drawing, Figure 1 is a longitudinal section, representing a device to show the position of the wheels when in use, and Fig. 2 is a section of the wheel.

A represents a frame of any suitable or desired construction, shown simply to represent the position of the wheels when in use; and, therefore, no claim is made to the frame. B represents the star-wheel, a series of which are placed upon transverse shafts in the frame. This wheel consists of a hub or sleeve forming a hub having radial arms projecting therefrom, the edges of said arms being cutting-edges, and the ends of which are sharp and broad. Each arm, C, is provided on each side with sharp angular projections $a$, of the form shown. These projections are arranged on opposite sides of the arm, one above the other, as shown, so that the ground is pulverized equally on each side of the arm to the extent of the length of both projections, it being understood that the wheels are arranged upon the shaft, so that the positions of the projections upon each adjacent wheel are above and below each other.

The operation is as follows: As the machine moves forward over the field the radiating arms cut and sink into the earth until the projections are buried, and the latter pulverize or stir up the earth, leaving the same in the desired condition.

I make no claim, broadly, to a star-wheel; but

Having thus fully described my invention, what I claim as new, and desire to secure by Letters Patent, is—

The star-wheel B having radiating arms C and the sharp angular projections $a$ upon either side of the wheel or arms, as and for the purpose set forth.

In testimony that I claim the above I have hereunto subscribed my name in the presence of two witnesses.

WILLIAM J. ATCHISON.

Witnesses:
GEORGE STEVENSON,
JOHN J. ATCHISON.